Patented Mar. 12, 1929.

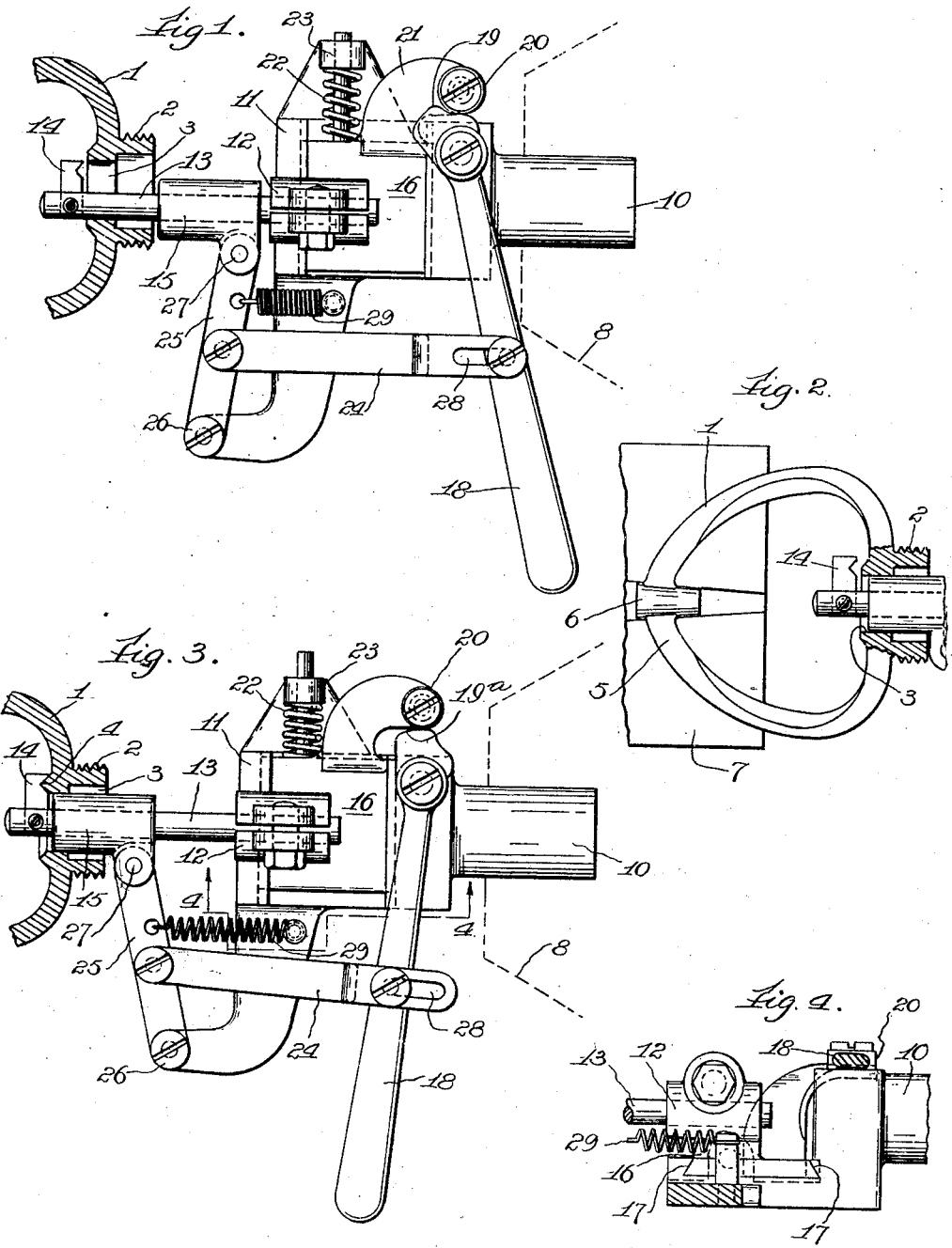

1,704,957

UNITED STATES PATENT OFFICE.

EMIL TYDEN, OF EVANSTON, ILLINOIS.

VALVE-SEAT CUTTER.

Application filed May 19, 1927. Serial No. 192,561.

The purpose of this invention is to provide a tool for machining a surface such as a valve seat which is not directly accessible but must be reached through an opening in the part, such as a bore through the valve seat surface. The invention consists in certain features and elements in combination as herein shown and described and as indicated by the claims.

In the drawings:—

Figure 1 may be considered a top plan view of a tool embodying this invention as mounted in a turret lathe or like machine, and showing in section a piece of work having a bore through which the cutting tool has just been entered.

Figure 2 is a fragmentary top plan view, partly in section, showing the work with the cutter of the tool entered therein and shifted to working position.

Figure 3 is a view similar to Figure 1 showing the cutter in operation.

Figure 4 is a vertical section taken as indicated at line 4—4 on Figure 3.

For purposes of illustration, the piece of work shown in connection with the tool is a sprinkler head casting for use in an automatic sprinkling system and comprising a frame portion, 1, extending from a threaded stem, 2, at opposite sides of the bore, 3, in said stem. The bore, 3, terminates within the outlines of the frame, 1, in an annular valve seat, 4, opposite which the frame is arched at 5 as seen in Figure 2 to carry a boss or abutment, 6, located co-axially with the bore, 3, and thereby obstructing access to the seat, 4, for machining it in the ordinary manner. The subject matter of this invention is a tool designed to be entered through the bore, 3, and then adjusted to work upon the valve seat, 4, and finally readjusted for withdrawal through said bore, 3. It may be understood that the frame, 1, of the casting is carried in a special chuck indicated at 7 in Figure 2, by which it is rotated in a lathe or similar machine while the tool which is to operate upon the valve seat, 4, is mounted by means of its shank, 10, in any suitable tool carriage or lathe turret as indicated in dotted outlines at 8 in Figures 1 and 3.

The body portion, 11, of the tool supports a clamping socket, 12, in which there is mounted a stem, 13, projecting toward the chuck, 7, and the casting carried therein, and having a cutting tool or blade, 14, removably secured in a suitable slot or socket near its outer end. A sleeve or bushing, 15, is slidably carried on the stem, 13, for movement between the blade, 14, and the clamp socket, 12.

The clamp socket, 12, is not integrally formed on the body, 11, but is provided with a base, 16, mounted for transverse movement in the guideways, 17, on the part, 11, to permit shifting the stem, 13, and its tool, 14, laterally from the position indicated in Figure 1 to that in which the parts are shown in Figure 3. The lateral extent of the blade, 14, is such that the blade and its supporting stem, 13, may be entered through the bore, 3, of the sprinkler head casting with the stem, 13, at one side of the axis of the bore. Such entry is effected by advance of the carriage or turret, 8, in the usual manner. After the blade, 14, has passed through the bore, 3, the stem, 13, is shifted to an axial position in the bore, 3, by operation of the lever, 18, whose cam, 19, engages a follower roller, 20, which is carried by an arm, 21, rigid with the base, 16, of the clamp socket, 12. This transverse movement of the base, 16, is effected in opposition to the pressure of a spring, 22, reacting against a boss, 23, on the body, 11. As the stem, 13, arrives at axial position in the bore, 3, the sleeve, 15, is automatically advanced by means of a link, 24, which connects the lever, 18, with a swinging arm, 25, fulcrumed at 26 on an extension of the body, 11, and pivotally attached at 27 to a suitable lug of the sleeve, 15. A slot, 28, in the link, 24, delays the advance of the sleeve, 15, until the centering movement of the stem, 13, has been completed and the concentric portion, 19$^a$, on the cam, 19, permits the necessary additional swing of the lever, 18, to take place without altering the position of the stem, 13.

When the cutting blade, 14, has thus been positioned ready for work as indicated in Figure 2, the carriage or turret, 8, is drawn back to bring the cutting edge of the blade against the valve seat, and the operation is performed with the work rotating in the chuck, 7. When the cut has been made as indicated in Figure 3, the carriage, 8, is again shifted to back the blade away from the finished surface, and the lever, 18, is then operated in reverse direction. A spring, 29, tensioned between the body, 11, and the lever, 25, withdraws the sleeve, 15, in the initial part of the return movement of the lever, 18, and the slot, 28, permits completion of the lever stroke, while the spring, 22, shifts the sliding base, 16, back to its original position so that at the end of the lever stroke, 18, the blade, 14, will be moved laterally far enough to permit its withdrawal through the bore, 3.

I claim:—

1. A tool for the purpose indicated comprising a stem, a cutter blade mounted at the forward end thereof to project laterally and having a rearwardly facing cutting edge for operating upon a forwardly facing area around a bore in a piece of work through which the cutter is entered, the stem being provided with a cylindrical filler back of the cutter blade dimensioned to fit such bore to steady the stem during the cutting operation, and supporting means for the stem adapted for mounting in a tool carriage which is movable to regulate the cut of the tool, said supporting means being arranged for shifting the stem laterally and moving the filler longitudinally for entry and withdrawal from the bore, independently of the carriage movement.

2. A tool for the purpose indicated comprising a body including a shank adapted to be secured in a tool turret or the like, a stem mounted on the body for lateral movement thereon, a cutter blade carried at the forward end of the stem to project laterally and having a rearwardly facing cutting edge for operating upon a forwardly facing area around a bore in a piece of work, the stem being provided with a cylindrical filler slidably carried thereon back of the cutter blade and dimensioned to fit such bore to steady the stem during the cutting operation, together with means on the body adapted for mounting in a tool carriage which is movable to regulate the cut of the tool, said means being arranged for shifting the stem laterally and moving the filler longitudinally thereon, independently of the carriage movement.

3. In the combination defined in claim 2, said shifting means comprising a cam for moving the stem laterally in one direction and a spring for returning it, together with linkage connecting the filler to the cam mechanism for operation therewith.

4. In the combination defined in claim 2, said shifting means comprising a cam for moving the stem laterally in one direction and a spring for returning it, together with linkage connecting the filler to the cam mechanism for operation therewith, said linkage including a lost motion connection permitting the lateral shifting of the stem to be completed before the filler is advanced to enter the bore in the work.

5. A tool for the purpose indicated, comprising a body formed for securement in a tool carriage or the like, a cutter holder including a stem projecting from said body toward the piece of work to be operated upon, a laterally extending cutter blade fixed to said stem having a rearwardly facing cutting edge engageable with its work by rearward feeding movement of the carriage, together with means for shifting the stem laterally on the body independently of such carriage movement to register the blade with an annular forwardly facing area of the work with the stem projecting through an opening within such area.

EMIL TYDEN.